April 28, 1964     M. D. STEPATH     3,131,290
ELECTRODE CONNECTION
Filed Nov. 17, 1961
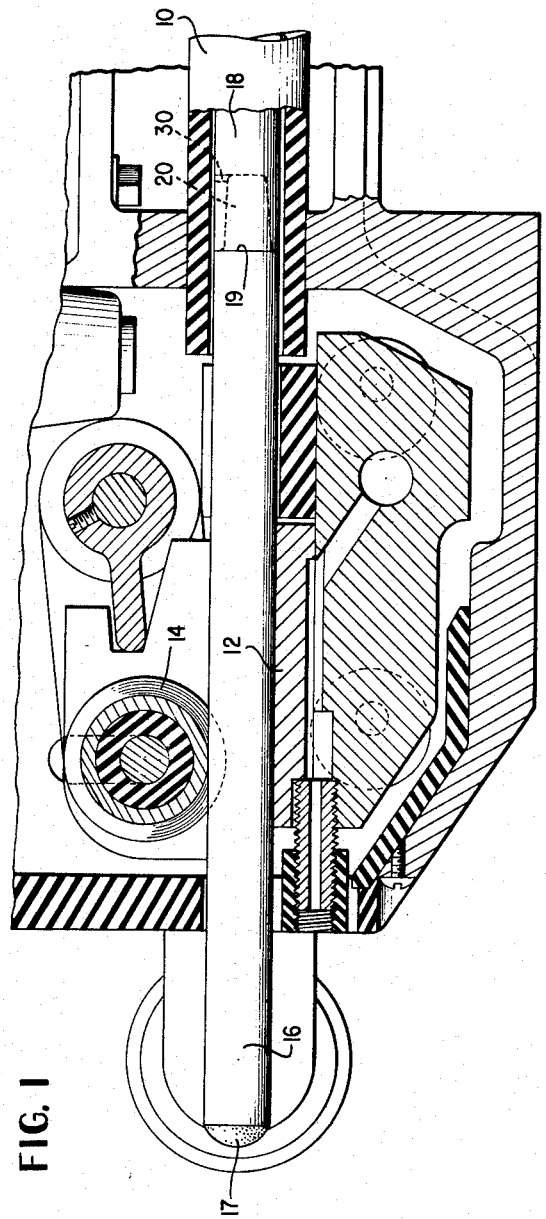
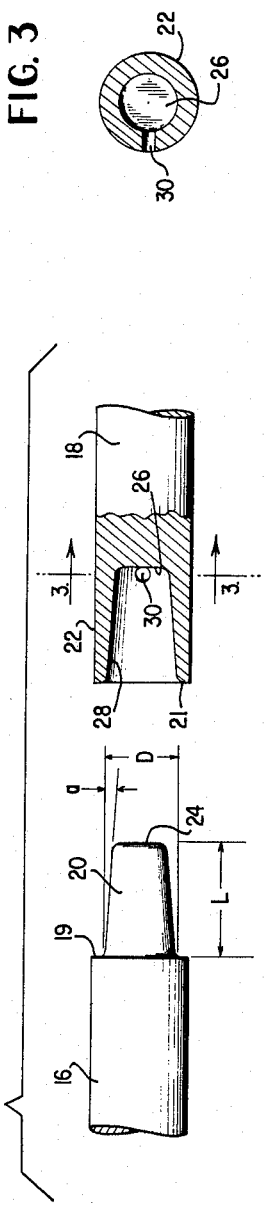
INVENTOR.
MYRON D. STEPATH
BY Mead, Browne, Schuyler, & Beveridge
ATTORNEYS.

United States Patent Office 3,131,290
Patented Apr. 28, 1964

3,131,290
ELECTRODE CONNECTION
Myron D. Stepath, Lancaster, Ohio, assignor to Arcair Company, Bremerton, Wash., a partnership
Filed Nov. 17, 1961, Ser. No. 153,135
4 Claims. (Cl. 219—130)

This invention is related to welding or cutting apparatus in which electrodes are continuously fed toward a workpiece to be consumed in a welding or cutting operation. The electrodes are fed toward the workpiece by various hand torches or automatic and semi-automatic apparatus to be consumed at the welding or cutting zone. One type of automatic unit is disclosed in United States Patent No. 2,989,617, granted June 20, 1961, which patent discloses a cutting torch in which a rigid carbon electrode is fed toward a workpiece at an accurately maintained rate of movement where its leading end is consumed by an electric arc.

An object of this invention lies in the provision of a joint for successively connecting a plurality of copper-coated carbon graphite electrodes so that a particular welding or cutting operation can be carried out to completion without interruption each time an electrode is consumed.

A further object is to provide a joint for electrodes that will not separate as it is being consumed by an electric arc.

In the attainment of these objects, copper-coated carbon-graphite electrodes are provided with male plug and female socket terminals formed at their opposite ends so that the plug and socket terminals of successive electrodes may be frictionally interfitted. Taking into consideration the coefficient of friction between mating carbon-graphite surfaces, the configuration of the terminals is such that a secure mechanical joint is provided between connected electrodes that will not separate during consumption by an electric arc.

To insure adequate strength of the female terminal, the relative proportions of the terminals are such that the minimum thickness of the wall of the female terminal is at least substantially one-sixth of the electrode diameter. This is accomplished by deriving the dimensions of the terminals as a percentage of the outside diameter of the electrode with the mating walls being tapered at an angle of substantially two degrees. Radii at all corners of the terminals minimize the concentration of stresses. The electrodes are fed toward the electric arc with the female terminal as the leading end of each electrode.

Accumulation of gases generated during consumption of the electrode may be prevented by the provision of a vent hole in the side wall of the socket terminal adjacent its end wall as a further means for preventing separation of the joint during consumption.

The objects and advantages of the invention will become apparent from the following description taken in connection with the accompanying drawing in which:

FIG. 1 is a sectional view of a portion of a cutting torch mechanism for feeding electrodes toward a workpiece; and FIG. 2 is a fragmentary view of the electrode terminals.

FIGURE 3 is a cross-sectional view taken on line 3—3 of FIGURE 2.

With reference to FIG. 1, electrode feeding apparatus is illustrated comprising an electrode feed tube 10, an electrode seat member 12 and a drive wheel 14. Slidably received in the electrode feed tube 10 and in driving engagement between seat member 12 and drive wheel 14 is a partially consumed copper-coated carbon-graphite electrode 16. The details of the feeding apparatus form no part of the invention, but the type illustrated is that disclosed in the above referred to Patent No. 2,989,617.

Clockwise rotation of drive wheel 14 causes the electrode 16 to be fed downwardly during a cutting operation where its leading end 17 is continuously consumed by the electric arc of the torch. Coupled to the trailing end 19 of electrode 16 is an electrode 18; the mating ends of the electrodes being joined by interfitting plug and socket terminals which are more clearly illustrated in FIG. 2.

As the terminals enter the electric arc zone, they are consumed along with the electrode. Should the terminals separate before they are completely consumed, pieces would fall onto the workpiece and interfere with the cutting or welding operation, requiring the operation to be halted until the bits and pieces can be removed.

Connecting the electrodes is a plug terminal 20 formed at the trailing end 19 of electrode 16 interfitted with a female socket terminal 22 formed at the leading end of electrode 18. At the junction of plug 20 with end 19, the plug has a major diameter D and the surface of the plug is tapered toward its end 24 at an angle $a$. Socket terminal 22 has an end wall 26 and side wall 28 for frictionally receiving plug 20, the side wall 28 being tapered outwardly at an angle $a$ toward the end 21 of the terminal 22.

To prevent cracking of the socket wall upon insertion of the plug terminal therein, the minimum thickness of the wall is maintained at substantially one-sixth of the electrode diameter. Accordingly, length L and major diameter D are determined as a percentage of the outside diameter of the electrode. Secure engagement between the interfitted terminals is obtained when the length L is approximately 112 percent of the diameter of the electrode and the major diameter D is approximately 66 percent of the electrode diameter, the side wall being tapered at an angle $a$ of about two degrees. All of the corners are rounded at a radius of approximately one-sixteenth of an inch to minimize stress concentration.

With the above relationship between the terminals and electrode diameter, the length and taper of the mating surfaces provide frictional forces sufficient to prevent separation of the joint as it enters the electric arc zone. Adequate thickness is provided at the outer end of the wall of the female socket, the thickness of the wall always being at least one-sixth of the electrode diameter, thereby reducing the possibility of cracking as the terminals are joined.

Secure connection between carbon-graphite electrodes is obtained by the above described joint not obtainable heretofore, resulting in fewer stoppages and increased speed of welding and cutting operations.

As the interfitted terminals 20 and 22 enter the heated zone, the high temperature encountered causes the gas generated by the consumption of the electrode material to expand rapidly. This rapid accumulation and expansion of gas in the joint exerts pressure tending to separate the plug from the socket. Provided in the side wall of the socket terminal adjacent its end wall 26 is a vent hole 30 which permits the escape of gases generated during consumption.

As the interfitted terminals come into contact with the heat of the electric arc, the gases generated by the heat escape through vent hole 30 until the terminals are completely consumed, thereby preventing a buildup of pressure in the joint. The diameter of vent hole 30 may be in the order of one-sixteenth of an inch, although the size is not critical and is limited only by the practicality of drilling a hole of less size.

With the electrodes provided with the above described plug 20 at one end and socket 22 at the other end, they can be successively connected and fed continuously during the cutting operation with the terminal 22 always as the leading end of each electrode. In this manner convenient lengths of electrodes can be quickly joined together, and the entire operation can be carried out without interruption, regardless of the size of the surfaces to be cut or welded.

While a specific embodiment of the invention has been disclosed for purposes of illustration, it will be understood that various modifications can be made by those skilled in the art without departing from the scope of the appended claims.

What I claim is:

1. A joint for connecting carbon-graphite electrodes comprising a socket terminal and a plug terminal frictionally received in said socket terminal, said plug terminal having a major diameter substantially two-thirds of the electrode diameter and a length about one and one-eighth times the diameter of the electrode, the wall of said plug terminal tapering from said major diameter, said socket terminal having an end wall and a correspondingly tapered side wall for frictionally receiving said plug terminal, the minimum thickness of said side wall being approximately one-sixth of the electrode diameter, and a vent hole in the side wall of said socket terminal preventing the accumulation of gas between said terminals.

2. A joint for connecting carbon-graphite electrodes comprising a socket terminal and a plug terminal frictionally received in said socket terminal, the length of said plug terminal being substantially 112 percent of the electrode diameter, said plug terminal having a major diameter at its junction with the electrode which is about 66 percent of the electrode diameter, the wall of said plug terminal tapering from said major diameter at an angle of substantially two degrees, said socket terminal having an end wall and a correspondingly tapered internal side wall for frictionally mating with the wall of said plug terminal, and a vent hole formed in the side wall of said socket terminal for preventing the accumulation of gas between said terminals.

3. Apparatus for welding comprising a plurality of copper-coated carbon-graphite electrodes successively connected by frictionally interfitted plug and socket terminals, said plug terminal having a major diameter at its junction with the electrode end which is approximately 66 percent of the electrode diameter and a side wall tapering therefrom at an angle of substantially two degrees, the length of said plug terminal being approximately 112 percent the electrode diameter, said socket terminal having a correspondingly tapered internal side wall and an end wall having corresponding internal dimensions for frictionally receiving said plug terminal whereby the minimum thickness of the side wall of said socket terminal is one-sixth of the diameter of the electrode, and stress reducing radii of approximately one-sixteenth of an inch formed at the base and end of the plug terminal and at the end of the side wall and edge of the end wall of the socket terminal.

4. Apparatus for welding and cutting comprising in combination a plurality of copper-coated carbon-graphite electrodes successively connected by frictionally interfitted male and female terminals, said male terminal comprising a plug portion extending from one end of an electrode having a major diameter at its junction with the electrode equal approximately to 66 percent of the electrode diameter and a length equal approximately to 112 percent of the electrode diameter, the wall of said plug portion being tapered at an angle of substantially two degrees from said major diameter, said female terminal comprising a socket having a corresponding internal configuration for frictionally receiving said plug portion, a vent hole in the wall of said socket adjacent its inner end and means for continuously feeding said electrodes toward an electric arc to be consumed thereby with the female terminal comprising the leading end of each electrode whereby gases generated by consumption of the terminals escapes through said vent hole to prevent separation of said terminals during consumption.

References Cited in the file of this patent

UNITED STATES PATENTS

| | | |
|---|---|---|
| 1,479,662 | Gray | Jan. 1, 1924 |
| 1,512,786 | Morton | Oct. 21, 1924 |
| 1,785,587 | Kuhlmann | Dec. 16, 1930 |
| 2,024,445 | Galehouse | Dec. 17, 1935 |
| 2,531,005 | Smith | Nov. 21, 1950 |
| 3,030,544 | Zamboldi et al. | Apr. 17, 1962 |

FOREIGN PATENTS

| | | |
|---|---|---|
| 473,636 | France | Oct. 3, 1914 |